United States Patent
Burgess et al.

(10) Patent No.: US 7,343,213 B1
(45) Date of Patent: Mar. 11, 2008

(54) SYSTEM AND METHOD FOR ANALYZING AND COMMUNICATING TRANSMISSION ASSEMBLY FAILURE INFORMATION

(75) Inventors: David Burgess, Lima, OH (US); Stime Davis, Maplewood, OH (US); David Delong, Belle Center, OH (US); Scott Gaver, Bellefontaine, OH (US); Doug Ruhenkamp, Minster, OH (US)

(73) Assignee: Honda Motor Co., Ltd., Tokyo (JP)

( * ) Notice: Subject to any disclaimer, the term of this patent is extended or adjusted under 35 U.S.C. 154(b) by 406 days.

(21) Appl. No.: 10/997,367

(22) Filed: Nov. 24, 2004

(51) Int. Cl.
*G06F 19/00* (2006.01)
*G06F 17/00* (2006.01)

(52) U.S. Cl. ............... 700/110; 700/108; 700/90; 702/183; 702/184

(58) Field of Classification Search ........... 700/110, 700/108, 29; 702/183, 185; 701/29
See application file for complete search history.

(56) References Cited

U.S. PATENT DOCUMENTS

| | | | |
|---|---|---|---|
| 5,089,970 A | 2/1992 | Lee et al. | 364/468 |
| 5,351,195 A | 9/1994 | Sherman | 364/468 |
| 5,706,213 A | 1/1998 | Takakura et al. | 364/552 |
| 5,983,194 A | 11/1999 | Hogge et al. | 705/7 |
| 6,141,647 A | 10/2000 | Meijer et al. | 705/1 |
| 6,341,271 B1 | 1/2002 | Salvo et al. | 705/28 |
| 6,345,259 B1 | 2/2002 | Sandoval | 705/7 |
| 6,516,239 B1 | 2/2003 | Madden et al. | 700/115 |
| 6,597,962 B2 | 7/2003 | Nonaka | 700/97 |
| 6,732,005 B1 | 5/2004 | Bobkin et al. | 700/115 |
| 2003/0158795 A1* | 8/2003 | Markham et al. | 705/28 |
| 2004/0255198 A1* | 12/2004 | Matsushita et al. | 714/37 |
| 2005/0038691 A1* | 2/2005 | Babu | 705/9 |

* cited by examiner

*Primary Examiner*—Kidest Bahta
*Assistant Examiner*—Nate Laughlin
(74) *Attorney, Agent, or Firm*—Standley Law Group LLP

(57) ABSTRACT

A computerized system and method is used to collect and record data regarding transmission failures, to analyze the transmission failure data to identify root causes of failures, and to communicate failure source information so countermeasures may be implemented to prevent future failures. Automobile dealers provide transmission failure data, as well as transmissions they are unable to repair, to a manufacturer's repair facility. Transmissions with common problems or faults are identified and selected for addition to a repair facility production schedule. Parts for repairing the transmissions are ordered based on the production schedule. Transmissions are then analyzed in detail and repaired according to the production schedule. As each transmission is examined, data is collected and recorded so that a root cause may be determined and communicated as needed to the manufacturer's production facilities, suppliers, etc. Countermeasures are then implemented to prevent the failures attributable to the root cause.

20 Claims, 16 Drawing Sheets

Bench Analysis Feedback System

Select Mission #: 418GQ1303 | Find | Basket # | VIN#: 1AAA12345AB6 | Claim #:

Tabs: Analysis Guide | Measurement | OP Standards | Failure Cause | Analysis | Analysis Attachments | Parts Ordering | Techline | ATR | Build Repair

Order Parts: (1002)

| Part No | Description | Total Ordered | Order Qty | Condition | Comments |
|---|---|---|---|---|---|
| 19432P8EA000 | HOSE ASSY B,ATF WARMER | 12 | | Damaged | bb-NowOpen |
| 23220PYB0200 | COUNTERSHAFT COMP | 8 | | Damaged | bb-NowOpen |
| 23230RAY0000 | SECONADARYSHAFT COMP | 6 | | Damaged | bb-NowOpen |
| 23235P0Z0000 | PLATE, OIL GUIDE | 8 | | Damaged | bb-NowOpen |
| 23451RAY0100 | GEAR, C-3 | 7 | | Missing | OPEN |
| 23531P7Z0000 | GEAR, COUNTER RVS | 7 | | Missing | OPEN |
| 23566P0Z0100 | HUB, SELECTOR | 7 | | Missing | OPEN |
| 24111P7W0000 | FORK, RVS SHIFT | 0 | | | |
| 24300P7W0000 | DETENT COMP, SERVO | 0 | | | |
| 24410PYB0000 | SHAFT COMP, CONTROL | 0 | | | |

"Must Change" Parts: (1004)

| Part No | Description | Condition | Comments |
|---|---|---|---|
| 23220PYB0200 | COUNTERSHAFT COMP | Missing | cc |
| 23230RAY0000 | SECONADARYSHAFT COMP | Damaged | bb |
| 23235P0Z0000 | PLATE, OIL GUIDE | Missing | cc |
| 23451RAY0100 | GEAR, C-3 | Damaged | bb |
| 23531P7Z0000 | GEAR, COUNTER RVS | Missing | cc |
| 23566P0Z0100 | HUB, SELECTOR | Damaged | bb |
| 24111P7W0000 | FORK, RVS SHIFT | | |
| 24300P7W0000 | DETENT COMP, SERVO | | |
| 24410PYB0000 | SHAFT COMP, CONTROL | | |
| 24535P7Z0000 | SPG, P/BRK | | |
| 2453AP0Z0000 | P/BRK LEVER ASSY | | |

Order Parts | Save | Cancel | Exit

FIG-16

SYSTEM AND METHOD FOR ANALYZING AND COMMUNICATING TRANSMISSION ASSEMBLY FAILURE INFORMATION

FIELD OF THE INVENTION

The present invention relates generally to systems and methods for managing repair of failed transmissions. In particular, the present invention relates to a system and method for analyzing transmission failures and communicating information regarding the sources of transmission failures so that countermeasures may be implemented to prevent future failures.

BACKGROUND OF THE INVENTION

Automobile transmission assemblies are complex products that comprise many parts and require many hours of labor to assemble. Because they are complex products, transmission failures may be attributable to many causes. Failures may be attributable to such causes as defective parts that are installed on the transmission, parts that fail during operation of the transmission, or parts that are installed improperly during production. Because there are many possible causes of a transmission failure, diagnosing the cause of a transmission failure and repairing it can be difficult, time consuming, and labor intensive.

Transmission problems are often reported initially by customers to automobile dealers who service the vehicles they sell to their customers. Automobile manufacturers typically supply their dealers with equipment that may be used to diagnose and correct transmission problems. In some instances, when the dealer is unable to correct the problem identified by the customer, the transmission is returned to the automobile manufacturer for correction (remanufacture) or replacement. The transmissions are usually shipped to a manufacturer's production facility or area dedicated to examining and repairing faulty transmissions. Each transmission is examined and repaired at the dedicated production area. Because the examination and repair are completed at a production facility of the manufacturer, parts may be ordered and received at the transmission repair facility just as they are at the manufacturer's regular production facilities. If the transmission cannot be repaired, it is replaced. Repair and replacement transmissions are then shipped from the production facility to the automobile dealers where the installation of the transmission into the customer's automobile is completed.

For automobile manufacturers, analyzing transmission failures to determine the root causes of the failures is an important step in preventing future failures. Once the source of a failure is determined, countermeasures may be implemented to reduce or eliminate the likelihood that the same or similar failures occur in the future. For example, if the failure is the result of a part that was installed incorrectly during manufacturing, production line countermeasures may be implemented. Associates who perform the operations resulting in the incorrect part installation may be advised or retrained on the appropriate operation (e.g., a torque left operation rather than a torque right operation to install the part correctly). In addition, subsequent quality checks may be implemented to ensure the part was installed using the appropriate installation techniques (e.g., correct torque operation). If the failure is attributable to defective parts supplied by a vendor, the vendor may be contacted and asked to provide conforming parts. In some instances, the manufacturer may make arrangements to obtain the parts from a different source.

Identifying the root cause or source of a failure can be difficult and time consuming. It often requires the availability of failure data for several transmissions to identify common symptoms, faults, and problems. Even if data is available for failure analysis, the difficult and time consuming nature of determining the root cause of transmission failures means there is often a delay between the time the source of the failure is determined and appropriate information regarding the failure source is communicated to others who can implement countermeasures to reduce or eliminate future failures. For problems that are attributable to production line installation procedures, supplier parts, etc., corrective action may be taken as soon as the information is received. However, long delays in identifying the source of a failure and between the time the source of the failure is discovered and countermeasures are implemented can result in additional failures.

Currently, information regarding transmission failures is communicated long after the first transmission problem is reported and only when the source of the problem has been determined at the transmission remanufacture production facility. The limited availability of transmission failure data makes analysis and identification of the source of a problem difficult. Even if the source of the problem is discovered during the examination of the transmission at the production facility, information regarding the problem may not be reported to the regular production facility, to a supplier, etc. until a written communication is generated and the relevant information is communicated to the appropriate personnel (e.g., by telephone, by fax, etc.). Therefore, there is a need for an efficient and effective system and method for collecting, analyzing, and communicating transmission failure information to personnel who can implement countermeasures to reduce or eliminate the likelihood of future failures.

SUMMARY OF THE INVENTION

The present invention is a system and method for analyzing and communicating transmission failure information. A computerized system and method is used to collect and record data regarding transmission failures, to analyze the transmission failure data and transmissions to identify root causes of failures, and to communicate failure source information to organizations and/or individuals who can implement countermeasures to prevent future failures. Data regarding the transmission failures are collected and recorded in various computers and transmitted to one or more databases. The data from the various sources are analyzed to determine whether a detailed root cause analysis should be completed for certain transmissions exhibiting similar or common symptoms, faults, problems, etc. The transmissions are analyzed and a reason for the transmission failures is identified. The failure source information is then communicated so that countermeasures may be implemented to reduce or eliminate the failures. In an example embodiment of the present invention, information for a transmission failure attributable to production control is communicated to a production line so that countermeasures may be implemented at the production line to prevent future transmission failures.

Transmission failure data is received from automobile dealers and stored in a computer system. The automobiles dealers provide information regarding the customer's statements (i.e., descriptions of symptoms and problems reported to the dealer) and the dealer's examinations and diagnoses of the reported problems. Transmissions the dealers are unable to repair are shipped to a manufacturer's facility for repair or replacement. This transmission failure data is analyzed to identify trends in the customer problem reports. The problem report data as well as other transmission related data is analyzed to identify transmissions that appear to have common problems or faults. Transmissions with common problems or faults are then selected and analyzed in detail prior to being repaired or remanufactured. Data for each of the analyzed transmissions is collected and recorded so that a root cause may be determined and communicated as needed. Countermeasures are then implemented to reduce or eliminate the failures attributable to the identified root cause.

BRIEF DESCRIPTION OF THE DRAWINGS

FIG. 3 is a core (transmission) ordering or selection screen for an example embodiment of the present invention;

FIG. 4 is an analysis guide screen for an example embodiment of the present invention;

FIG. 5 is a measurement screen for an example embodiment of the present invention;

FIG. 7 is a failure cause screen for an example embodiment of the present invention;

FIG. 8 is an analysis screen for an example embodiment of the present invention;

FIG. 10 is a parts ordering screen for an example embodiment of the present invention;

FIG. 11 is a techline report screen for an example embodiment of the present invention;

FIG. 12 is an ATR screen for an example embodiment of the present invention;

FIG. 13 is a build repair screen for an example embodiment of the present invention;

FIG. 14 is a reassembly screen for an example embodiment of the present invention;

FIG. 16 is a problems-concerns screen for an example embodiment of the present invention.

DESCRIPTION OF EXAMPLE EMBODIMENTS

Figure 1:
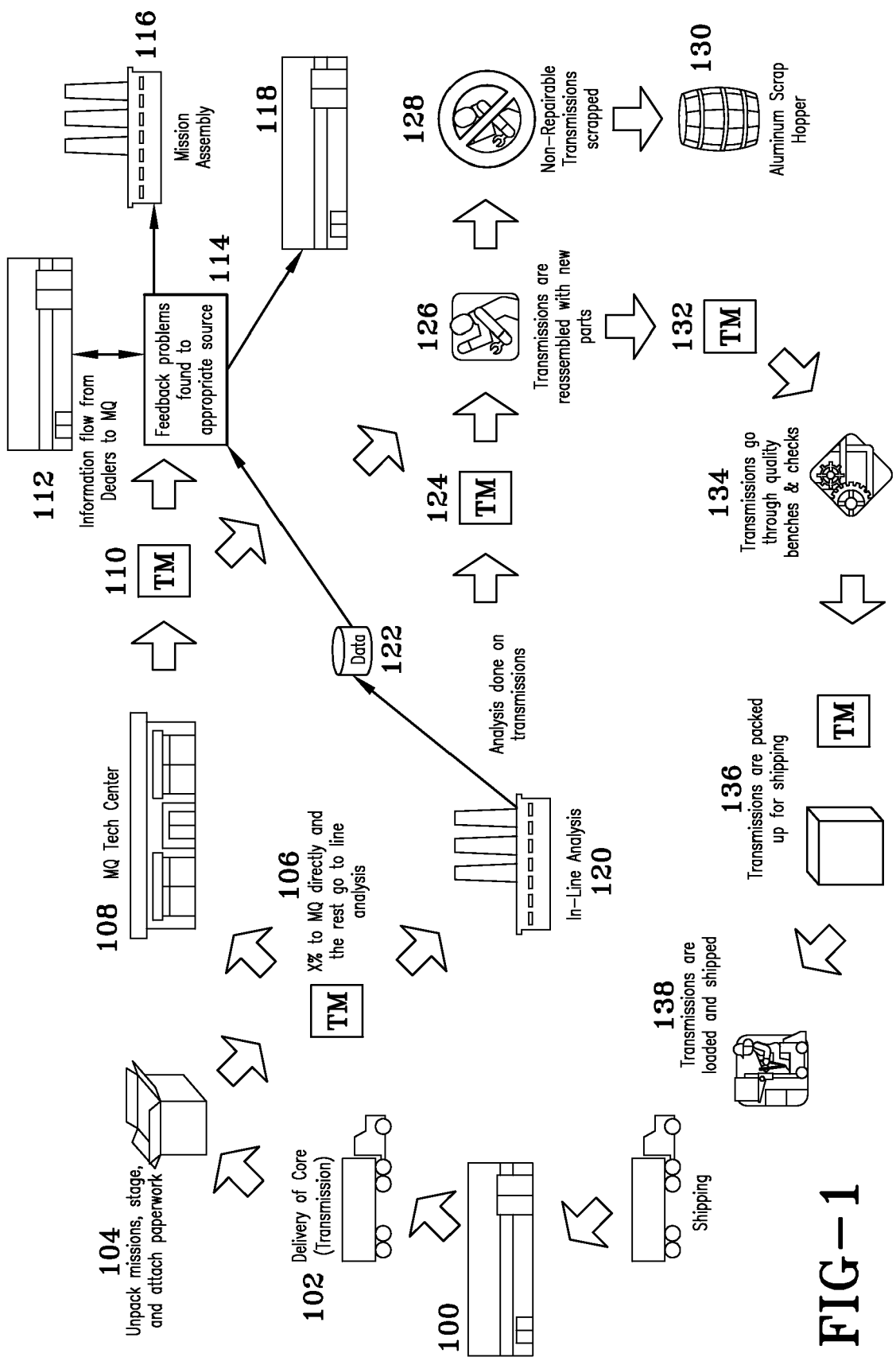
FIG. 1 is a flow diagram for an example embodiment of the present invention.

Referring to FIG. 1, a flow diagram for an example embodiment of the present invention is shown. Failed transmissions are returned by automobile dealers to the manufacturer for analysis and servicing according to the present invention. Transmissions (also called "missions" or "cores") are received from automobile dealers at the automobile manufacturer's parts and operations service center 100. Each incoming transmission is assigned a serial number that is used to track the transmission in the computerized system of the present invention. As transmissions are transferred to different areas, analyzed, and repaired for transport back to the automobile dealers, status indicators are used to identify each transmission's approximate location. For example, the status indicators "shipped," "finished," "in inventory at the transmission reassembly facility," "in inventory at the parts and operations service center," or "not received" may be used. From the manufacturer's parts and operations service center 100, the transmissions are transported by truck 102 to the automobile manufacturer's transmission service center 104. At the transmission service center 104, they are unloaded and staged 106 for transport to an inline analysis area 120 or to a market quality (MQ) technology center 108 for testing. Testing data is collected and recorded at the MQ technology center 108 for later analysis by a market quality department 114. The tested transmissions 110 are then transferred to the manufacturer's transmission reassembly facility 126 where they are repaired and returned to the customer.

Transmissions that are not selected for testing are transferred to a manufacturer's inline analysis area 120 where they are examined and analyzed. Associates examination each transmission and interact with a software application on a computer that guides them through data collection and analysis steps. Associates are prompted to enter data related to various symptoms, faults, or problems that are detected during the examination of the transmission. The computer then prompts the associate for information that is designed to determine the root cause of the failure. The computer also guides the associate in determining repair requirements so that parts may be ordered to complete the remanufacturing of the transmission. Data is collected and recorded in a database 122 throughout the transmission examination and analysis process so that it may be reviewed and analyzed later by the market quality department 114.

Transmissions that have been analyzed 124 (as well as transmissions received from the MQ technology center 108) are transferred to a reassembly production area where they are repaired with new parts 126. The reassembled transmissions 132 are then transferred for quality benches and checks 134. After completion of the quality benches and checks, they are packed for shipping 136, loaded on trucks 138, and returned to the parts and operations service center 100. From the parts and operations service center 100, they are shipped back to the automobile dealers.

Sometimes the transmissions in reassembly 126 may not be repairable. In these instances the non-repairable transmissions 128 are transferred to an aluminum scrap hopper 130 where the transmission aluminum is recovered.

A market quality analyst reviews and analyzes data from several data sources to determine the causes of various transmission failures 114. The analyst reviews and analyzes MQ technology center data 108 and the inline analysis data 122. The analyst also reviews and analyzes problem report data that is received from the automobile dealers who report transmission problems to the manufacturer 112. Feedback including the analyst's results and conclusions are communicated to appropriate sources. If a transmission failure is attributable to production control, failure information is communicated to the manufacturer's transmission assembly facility 116 (where new transmissions are built) and/or the new model production facility 118 so that countermeasures may be implemented at the production facilities to reduce or eliminate similar failures in the future.

Figure 2:
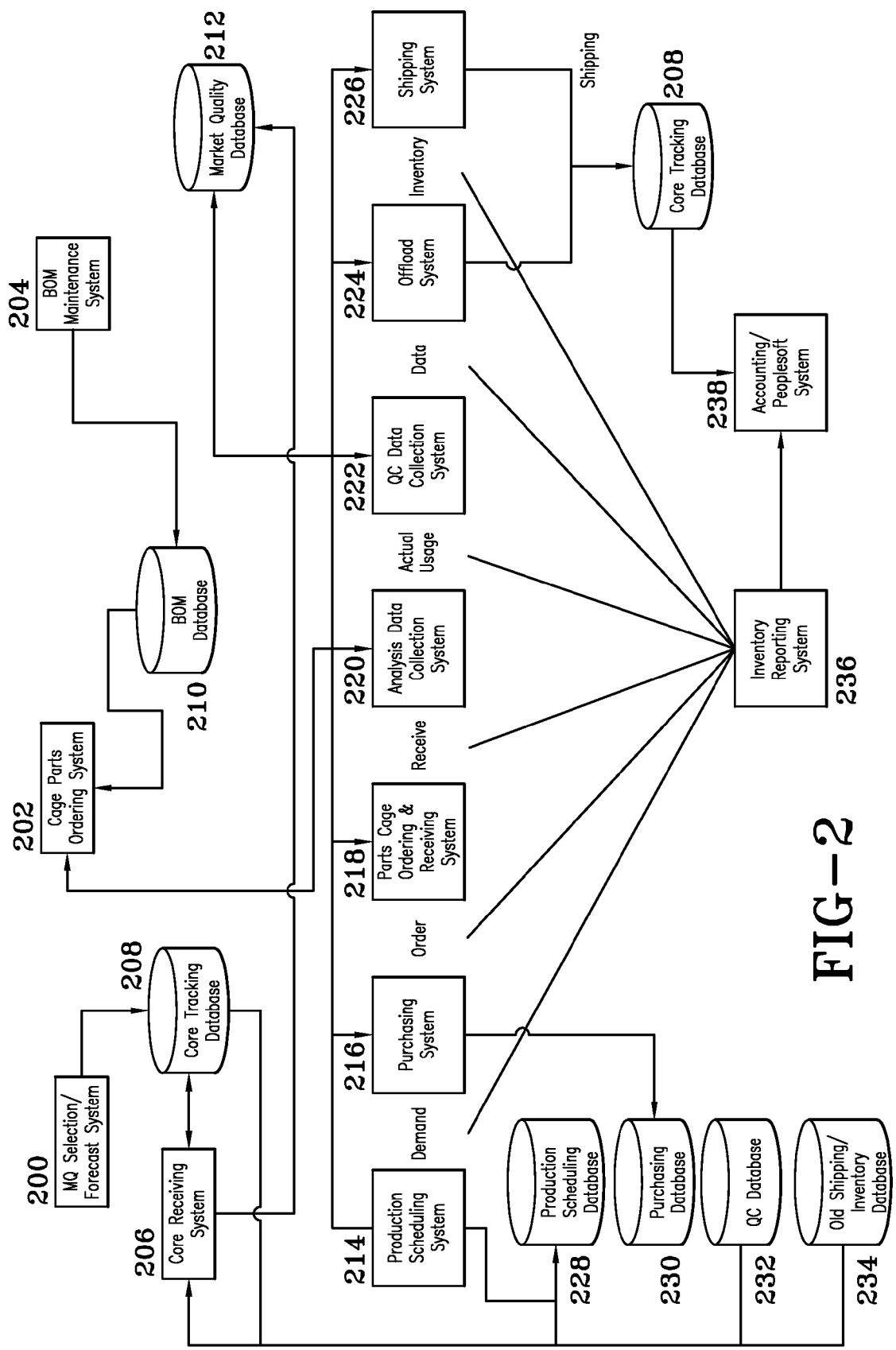
FIG. 2 is a software architecture diagram of the primary components for an example embodiment of the present invention.

The present invention may be implemented using a plurality of software components that provide the features and functionality of the present invention. Data is collected through various software components and stored in one or more databases. Data from the databases is also retrieved, reviewed, and analyzed using various software components. Referring to FIG. 2, a software architecture diagram of the primary components for an example embodiment of the present invention is shown. A core (transmission) receiving system component 206 is used to enter and review data in a core tracking database 208 regarding transmissions that are received from automobile dealers for remanufacture. The core receiving system component 206 also uses data from a quality control database 232 and shipping/inventory database 234. Transmissions are tracked by serial numbers that may be entered into the core receiving system component 206 to retrieve data that has been collected and stored previously for each transmission. The transmission data may comprise customer problem report data that was entered into the automobile dealer's computer system prior to returning the transmission. The problem report data may comprise a customer statement (e.g., textual description of the issue), the automobile's mileage, and a description of the dealer's diagnosis and attempts to correct the problem. The problem report data may further comprise a ranking such as structural, functional, or cosmetic.

Customer statements typically relate to a customer's description of a problem that has been observed. The customer may state that the transmission has been damaged, that the check engine light is on, etc. The automobile dealer may use equipment supplied by the manufacturer to diagnose the problem. The dealer also provides information for the problem report by entering the diagnosis information (e.g., speed sensor does not work) and describing the repair attempts (e.g., replaced speed sensor).

A market quality (MQ) selection and forecast system software component 200 is used by a market quality analyst to review and analyze data in the core tracking database 206 to select or order transmissions for a detailed inline analysis. The analyst may review market trends to identify transmissions that are candidates for inline analysis. To complete the trend analysis, the analyst may search the problem reports based on model and keyword (e.g., damage, etc.). The selection and forecast system software component 200 locates the reports that contain the specified keywords. If it appears the number of reports containing the keyword for a selected model is increasing (e.g., from four a month to 12 a month), the analyst may select or order the transmissions identified in the report for inline analysis. The selected transmissions are then added to the production schedule for analysis and repair. Transmissions may also be selected for testing at the MQ technology center.

A production scheduling system software component 214 and production scheduling database 228 is used to schedule the selected transmissions for inline analysis and reassembly or repair. The production schedule determines the demand for parts that are needed to complete the reassembly or repair of each transmission. Different types of repairs may require different sets of parts. Each type of repair may have a specific set of parts that must be replaced for the repair to be completed. In some cases, it may be necessary to order other parts in addition to the parts that are required to be replaced. A purchasing system software component 216 and purchasing database 230 facilitate the ordering of parts for the transmission reassembly according to the production schedule. The purchasing orders are processed and parts are received (for example, from the manufacturer's parts consolidation center). A parts cage ordering and receiving software component 218 facilitates the receipt of ordered parts so that the inline analysis and reassembly may be completed according to the production schedule.

A cage parts order system software component 202 facilitates the delivery of parts for repair of transmissions that have been analyzed in the inline analysis area of the transmission service center. Upon completion of each transmission analysis, an associate may identify additional parts that are needed to complete the repair of the transmission in the assembly area of the transmission service center. Additional parts may be ordered so that all of the parts that are needed to complete each repair, including the parts that must be changed according to the type of failure, are available to complete the transmission reassembly. A bill of materials (BOM) maintenance system software component 204 and BOM database 210 support the cage parts ordering system software component 202.

An analysis data collection system software component 220 is used to collect and record data related to each inline analysis of a transmission at the transmission service center. Associates in the inline analysis area of the transmission service center examine each transmission that has been selected for inline analysis and use the analysis data collection system software component 220 to record their findings. The software prompts the associates for input and guides them through the analysis.

Once the inline analysis is completed, the transmission is ready for the reassembly area. Associates in the reassembly area of the transmission service center review the inline analysis and diagnostic data and use the cage parts ordering system software component 202 to order any additional parts needed to complete the reassembly. The results of the inline analysis may indicate that additional parts are needed to complete the repair. The needed parts are delivered to the reassembly area so the transmission repair may be completed. Repair data is recorded and the transmission is forwarded to a quality check testing area. A quality check data collection system software component 222 is used to collect and record data related to the quality checks that are performed on the transmission.

An offload system software component 224 and shipping system software component 226 facilitate the transfer of repaired transmissions to the parts and operations service center so they may be returned to the automobile dealers who sent them for service. The core tracking database 208 is updated to reflect the change in status for each transmission that is analyzed and repaired (or scrapped). An inventory reporting system software component 236 receives input from the various software components as shown in FIG. 2 to track the ordering and usage of parts for transmission repairs. Data from the inventory reporting system software component 236 and core tracking database 208 may be used by an account software component 238 to analyze data regarding transmission analysis and repair efforts and parts ordering and usage.

Transmissions are selected (or ordered) for inline analysis and repair according to a trend analysis of problem reports. For example, if the number of reports for a particular problem appears to be increasing each month, the transmissions with the specified problem are selected or ordered for inline analysis and repair. The selected transmissions, which are identified by serial number, are scheduled for production according to a production scheduling system software component. The production schedule determines when parts should be ordered so that they are available when the transmissions are analyzed and repaired. During each production work day, transmissions are analyzed and repaired according to the production schedule.

Figure 3:
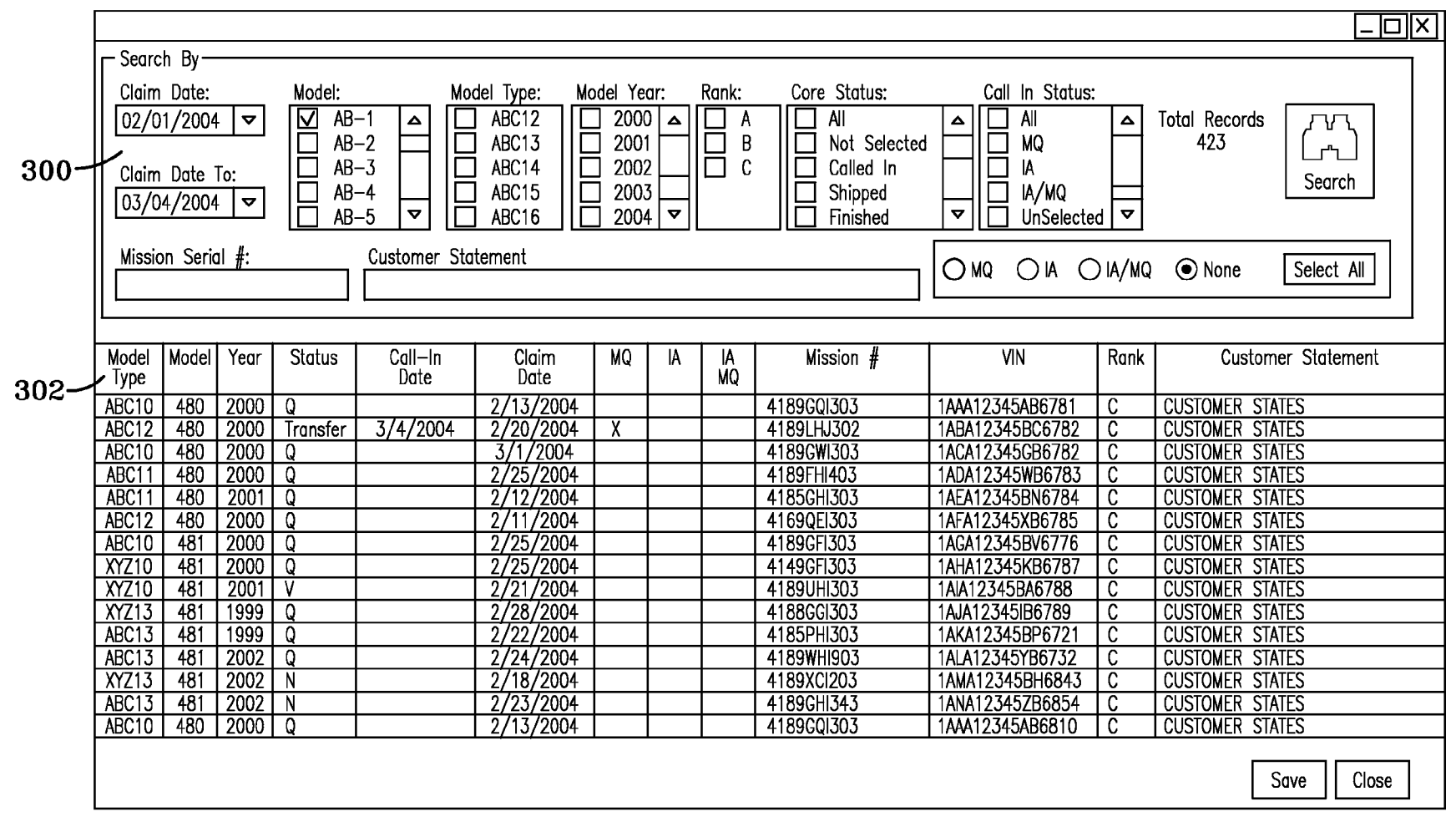

Referring to FIG. 3, a core (transmission) ordering or selection screen for an example embodiment of the present invention is shown. A core tracking database comprises detailed information regarding transmissions that have been shipped to a manufacturer's transmission service center for repair or replacement. The information tracked for each transmission includes model type, model, year, transmission status, call-in date (when the transmission was selected for inline analysis or testing), claim date, transmission serial number, and vehicle identification number 302. It also includes customer statement data and a problem rank (e.g., structural, functional, cosmetic). An associate may enter search criteria to select transmissions for transfer to a market quality (MQ) area for testing and/or to an inline analysis (IA) area where a detailed analysis of the transmission is completed prior to repair. MQ, IA, and IA/MQ indicators appearing on the screen may be selected by the associate to indicate whether the specified transmissions should be transferred to market quality (MQ), inline analysis (IA), or both.

The search criteria that the associate may enter includes a claim date, claim date range, model, model type, model year, rank, core status, call-in status (to select all transmissions, transmissions in market quality (MQ), transmissions in inline analysis (IA), both, or neither), transmission serial number, or customer statement. The associate may enter a text string to search the customer statement data and identify transmissions that are subject to similar statements or a common problem. The associate may select the transmissions that appear to have a common problem for transfer to MQ and/or IA for additional testing or analysis. The transmissions that are selected are then added to a production schedule and transferred for processing according to the production schedule.

Figure 4:
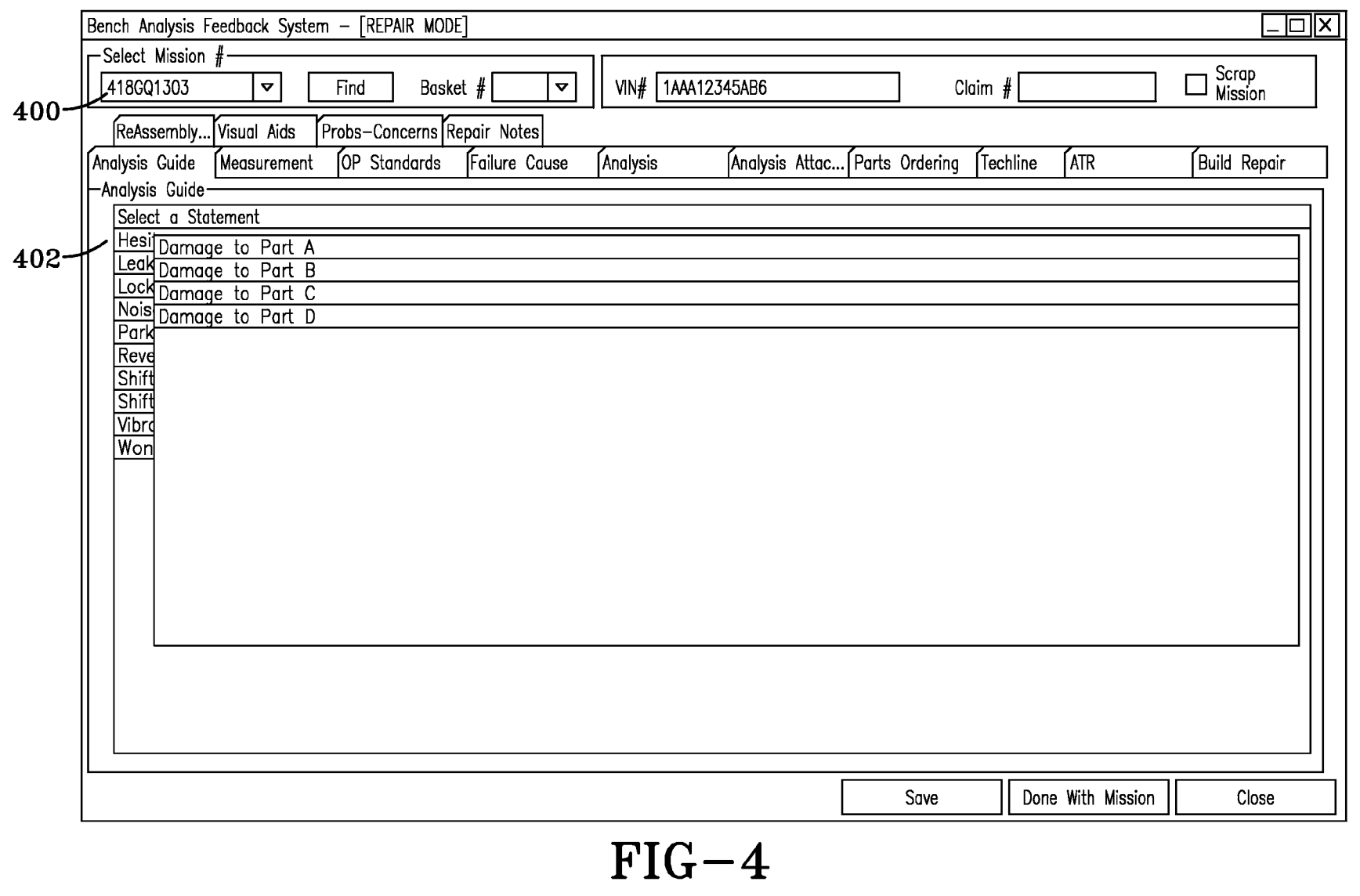

Associates who perform an inline (or bench) analysis of a transmission interact with an analysis data collection system software component that comprises screens for entering and reviewing information related to an inline analysis. The associates are guided through the analysis so that a root cause for the transmission failure may be determined. Referring to FIG. 4, an analysis guide screen for an example embodiment of the present invention is shown. The transmission that is the subject of the inline analysis is identified by serial number at the top of the screen 400. The associate begins the analysis by selecting a customer statement related to the transmission 404 in the analysis area. Selection of a statement (e.g., leaks) results in the display of a list of sources for the leak (e.g., from a cooler pipe joint, from a sensor/solenoid/seal bolt/drain bolt, from a torque converter housing area, from case halves, from a differential area, or from miscellaneous external parts). The associate selects the appropriate source based on an examination of the transmission. If there are additional statements associated with the transmission, they may be selected and the associate may select an option from a list of possible sources for the selected statement. The identification of specific sources related to the statements assists in determining the root cause of the transmission problem.

Figure 5:
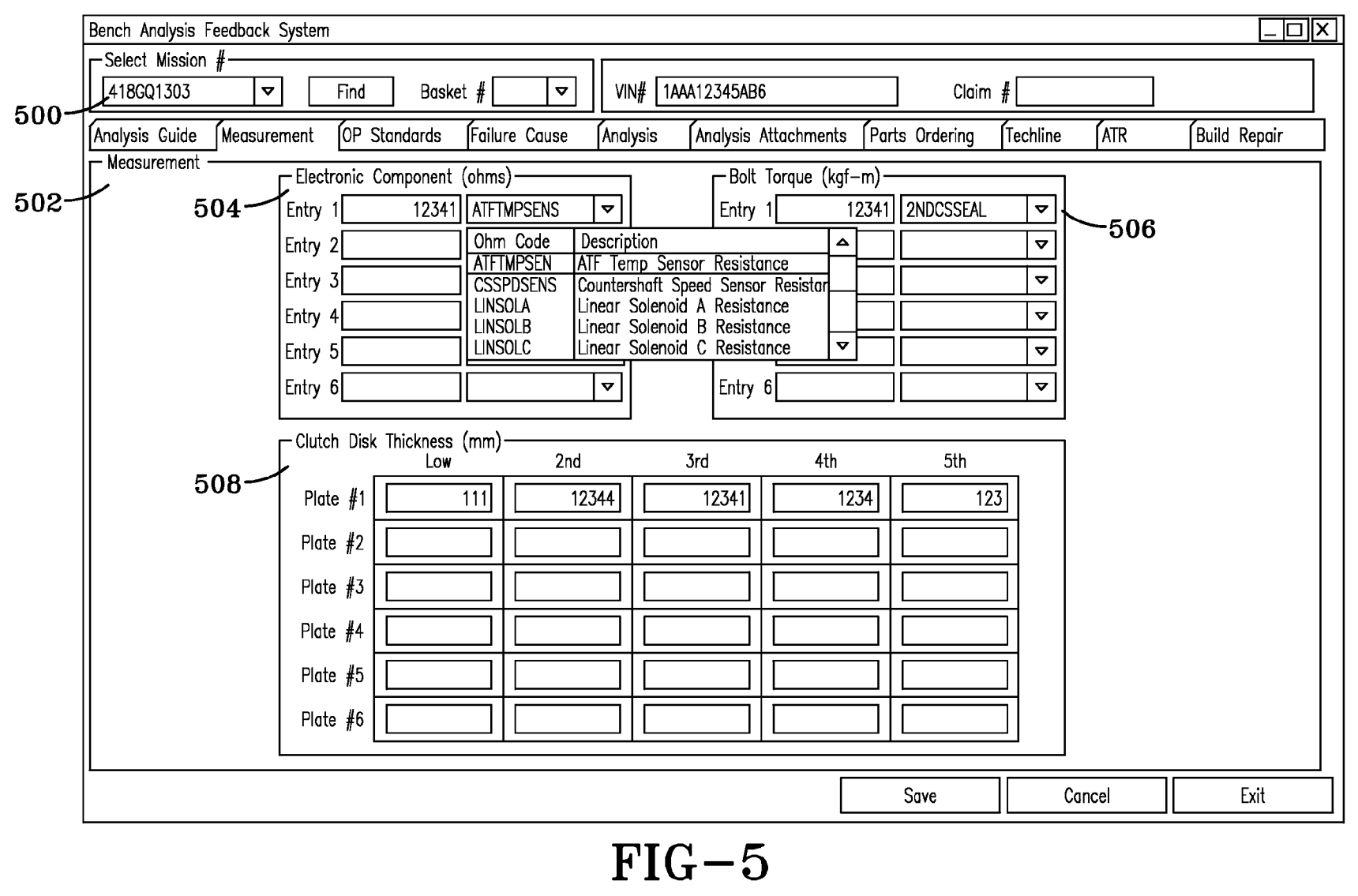

Referring to FIG. 5, a measurement screen for an example embodiment of the present invention is shown. The transmission that is the subject of the inline analysis is identified by serial number at the top of the screen 500. Measurement data 502 is entered through several sections on the screen 504, 506, 508 that allow the associate to enter measurement data related to various parts of the transmission. The associate inspects and measures the indicated parts and then enters the measurement data. The measurement data may be compared against standards or specifications and used later to diagnose the root cause of the transmission failure.

Figure 6:
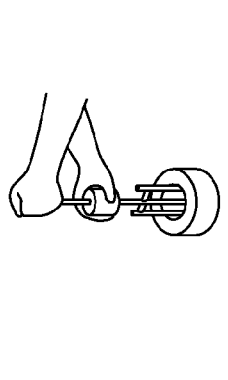
FIG. 6 is a process standards screen for an example embodiment of the present invention.

Referring to FIG. 6, a process standards screen for an example embodiment of the present invention is shown. The transmission that is the subject of the inline analysis is identified by serial number at the top of the screen 600. The process standards information appearing on the screen instructs the associate on the disassembly of the transmission so that it may be examined and inspected as needed to complete the inline analysis. The associate selects a process and unit from a menu 602 to retrieve a process description from a database of process descriptions. The process description 604 comprises a unit description that outlines the tasks to be performed by the associate to complete the process (e.g., remove C/Shaft $3^{rd}$ clutch bearing), quality points that provide instructions to follow depending upon the results of the inspection (e.g., order new parts if the inspected parts appear to be damaged), safety points regarding equipment and tools used in the process, and a description of potential or past problems. The associate may select processes and units (tasks within a process) as needed to complete the disassembly and inspection of the transmission.

Figure 7:
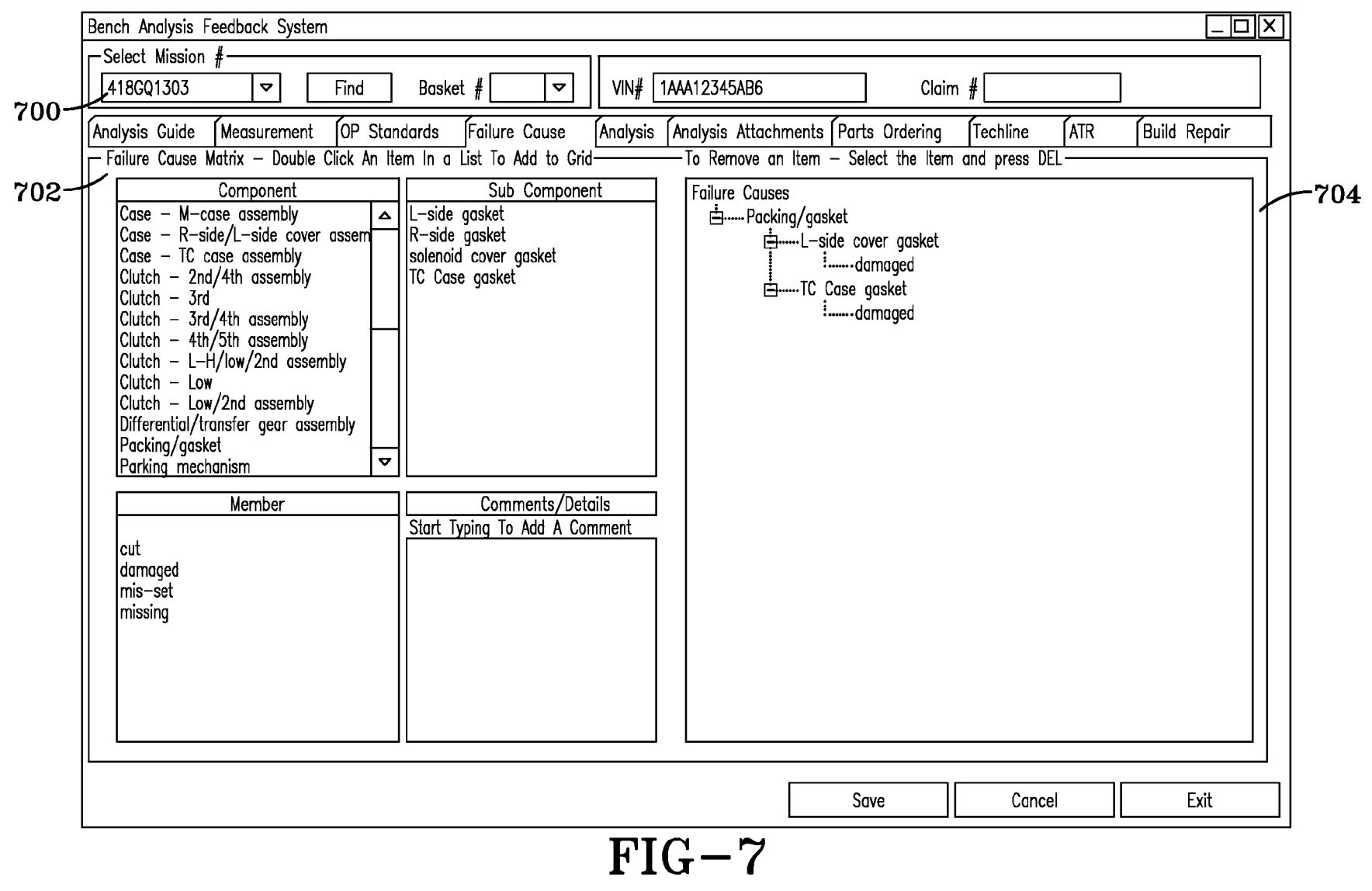

Referring to FIG. 7, a failure cause screen for an example embodiment of the present invention is shown. The transmission that is the subject of the inline analysis is identified by serial number at the top of the screen 700. The failure cause screen allows the associate to make selections regarding inspected components to build a failure cause matrix or tree 704. The screen comprises sections for selecting a component, subcomponent, and member (i.e., the observed problem) 702. The failure cause tree 704 reflects the selections made by the associate to provide a graphical view of the various problems that have been identified with respect to the components and subcomponents that have been inspected. For example, as shown in the failure cause tree 704, the associate may observe problems with two subcomponents of a packing gasket component. One subcomponent—the left side cover gasket—may appear to have been damaged. The second subcomponent—the TC Case gasket—may appear to be damaged. This information, which is entered on the failure cause screen, may be used to determine a root cause for the transmission failure. The associate may also enter comments or details regarding the failure cause to further clarify what was observed.

Because the associate is provided with selections for describing components and observations, the problems are described in detail and using standard terminology. As a result, it is easier to determine whether one or more transmissions had a similar set of symptoms or faults. The ability to group transmissions according to symptoms or problems facilitates the determination of a root cause for the transmission failures. For example, the discovery of miss-set sub-components in a number of transmissions could indicate a production control problem that may be corrected very quickly with additional training, a quality alert, etc. for the associates who assembly new transmissions or install transmissions on new automobiles.

Figure 8:
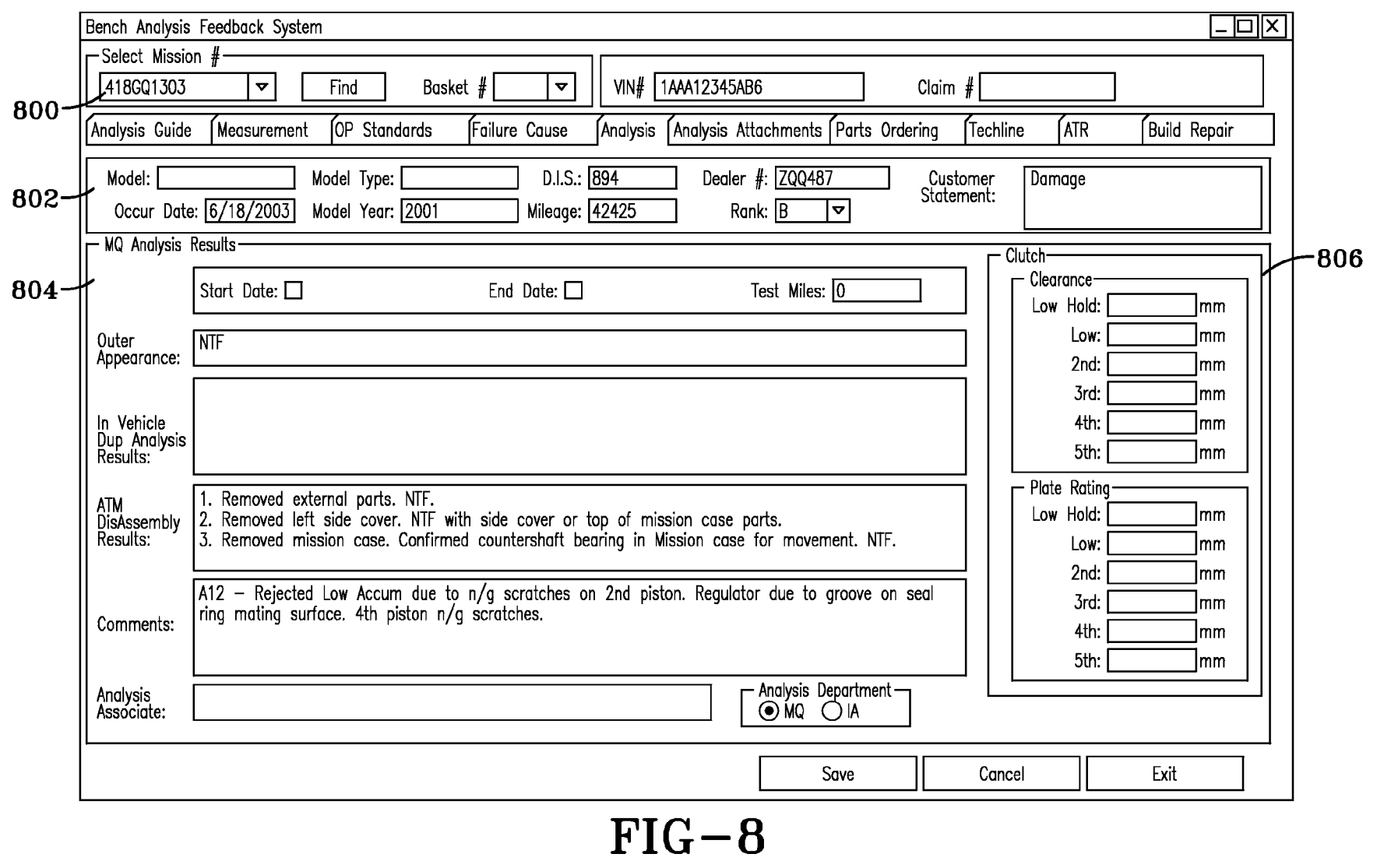

Referring to FIG. 8, an analysis screen for an example embodiment of the present invention is shown. The transmission that is the subject of the inline analysis is identified by serial number at the top of the screen 800. Information regarding the automobile model, model type, model year, occurrence date, mileage, dealer, problem rank (e.g., structural, functional, cosmetic), and customer statement may be entered or selected 802. Detailed information regarding the analysis may be entered in the remaining sections of the screen 804, 806. In one section, an associate may provide details regarding the analysis start and end dates and note any test miles that were driven. The associate may also describe the outer appearance of the transmission, the inline analysis results for any in-vehicle analysis that was completed, (in-vehicle dup. analysis results), ATM disassembly results, comments, and identifying information for the associate entering the information. The associate may further enter data related to the clutch 806. This data provides details regarding the analysis that was completed and may facilitate the determination of a root cause for the transmission failure.

Figure 9:
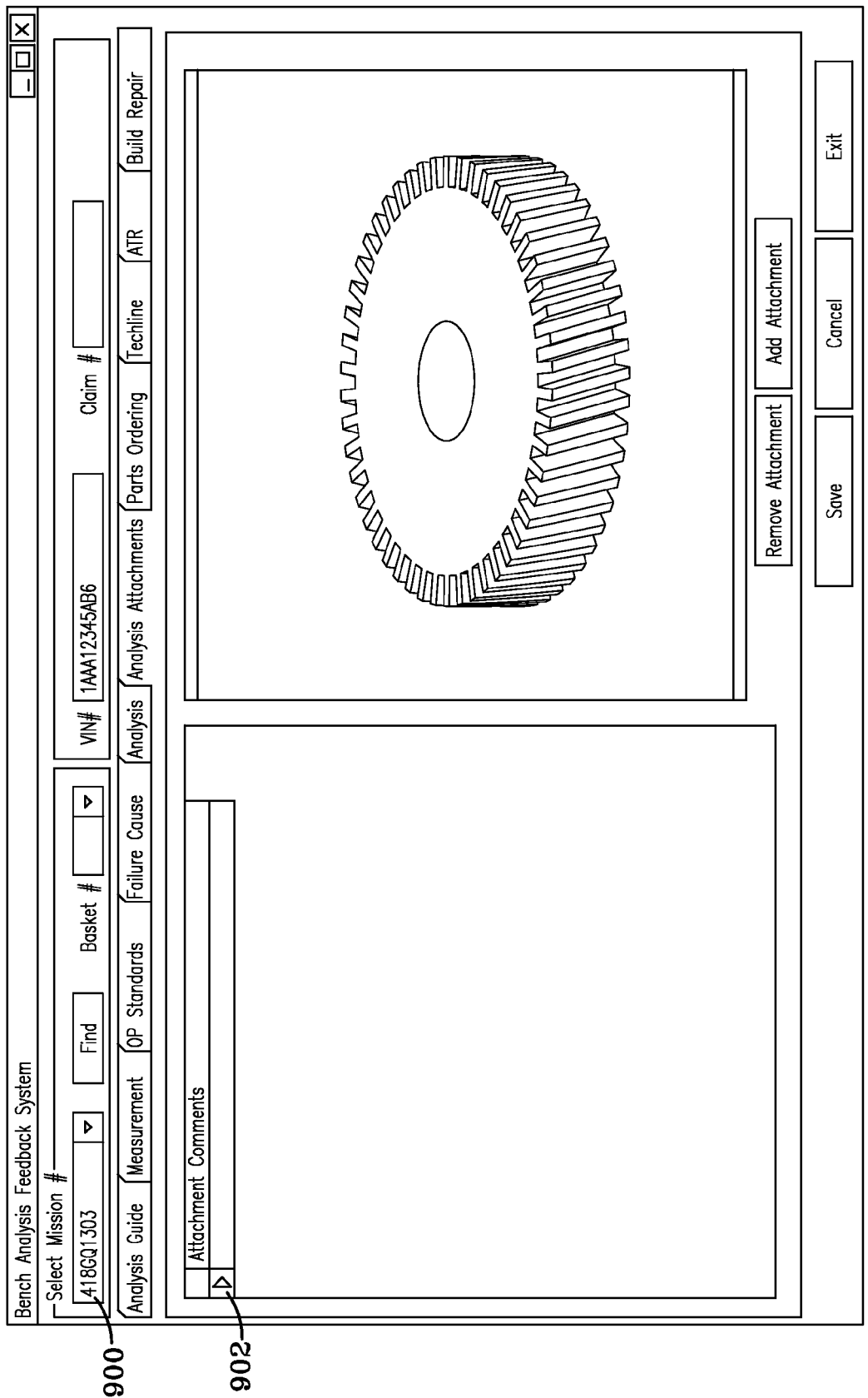
FIG. 9 is an analysis attachment screen for an example embodiment of the present invention.

Referring to FIG. 9, an analysis attachment screen for an example embodiment of the present invention is shown. The transmission that is the subject of the inline analysis is identified by serial number at the top of the screen 900. An associate may attach photographs or other diagrams/drawings that may be helpful in determining a root cause for a transmission failure.

Referring to FIG. 10, a parts ordering screen for an example embodiment of the present invention is shown. The transmission that is the subject of the inline analysis is identified by serial number at the top of the screen 1000. Depending upon the type of transmission failure, certain parts must be changed to complete the reassembly. One section of the screen identifies the parts that must be changed 1002. During the inline analysis or reassembly, other parts may be determined to be defective or missing. A second section identifies other parts that were needed to complete the transmission repair 1004. Data related to the parts that were replaced to complete the repair may facilitate the determination of a root cause for the transmission failure.

Figure 11:
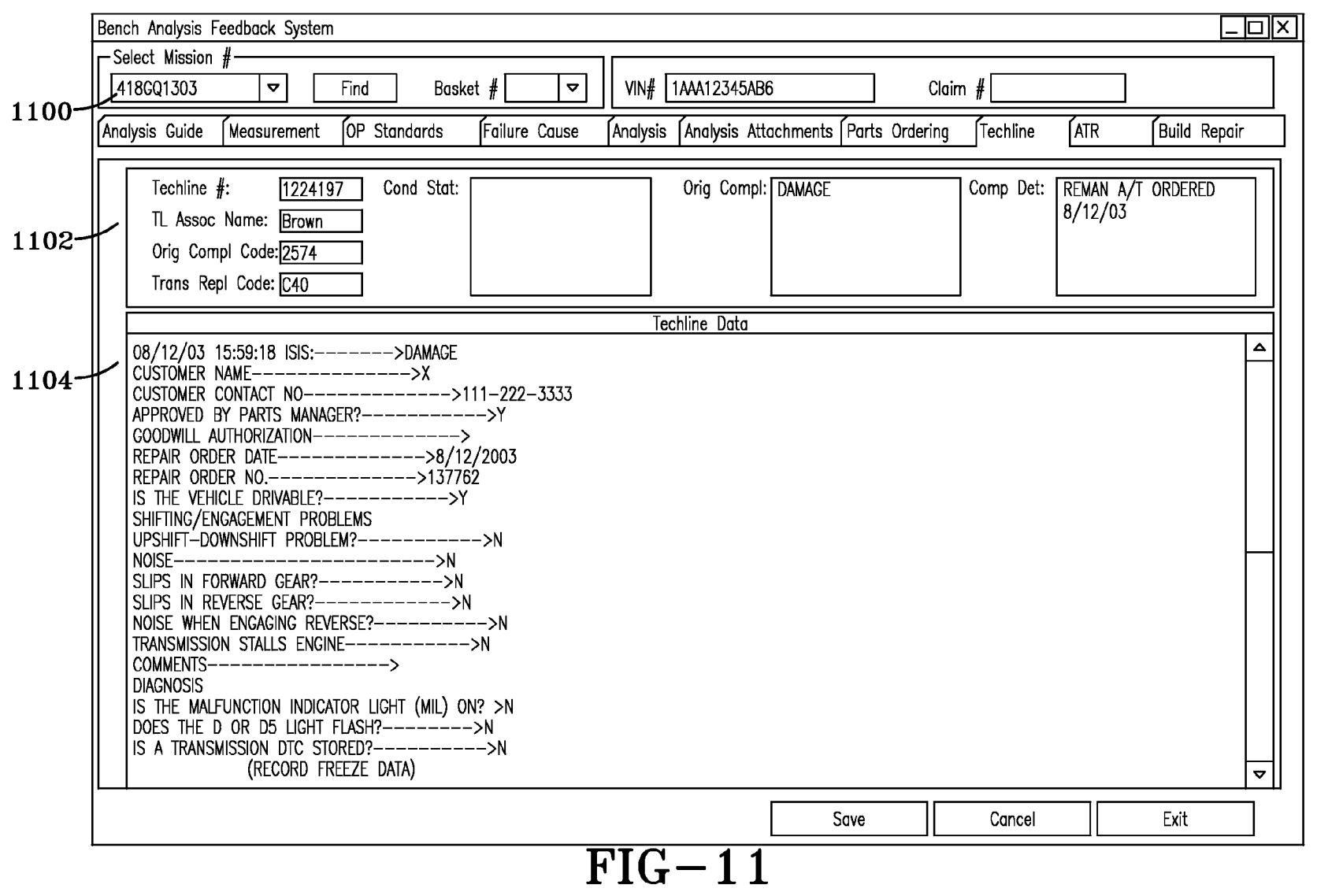

Referring to FIG. 11, a techline report screen for an example embodiment of the present invention is shown. A techline report comprises diagnostic data recorded by the automobile dealer when a customer reports a transmission problem to the dealer. The dealer is asked to answer a series of questions that assist the dealer in diagnosing the transmission problem. Questions may include: "is the vehicle drivable?" and "does the transmission stall the engine?" The detailed diagnostic inquiry may facilitate determining a root cause for a transmission failure.

On the techline report screen, the transmission that is the subject of the inline analysis is identified by serial number at the top of the screen 1100. Information near the top of the screen 1102 identifies the techline report and associate as well as code and status information. The techline data 1104 comprises identifying information for the customer as well as the answers to the techline questions answered by the associate.

Figure 12:
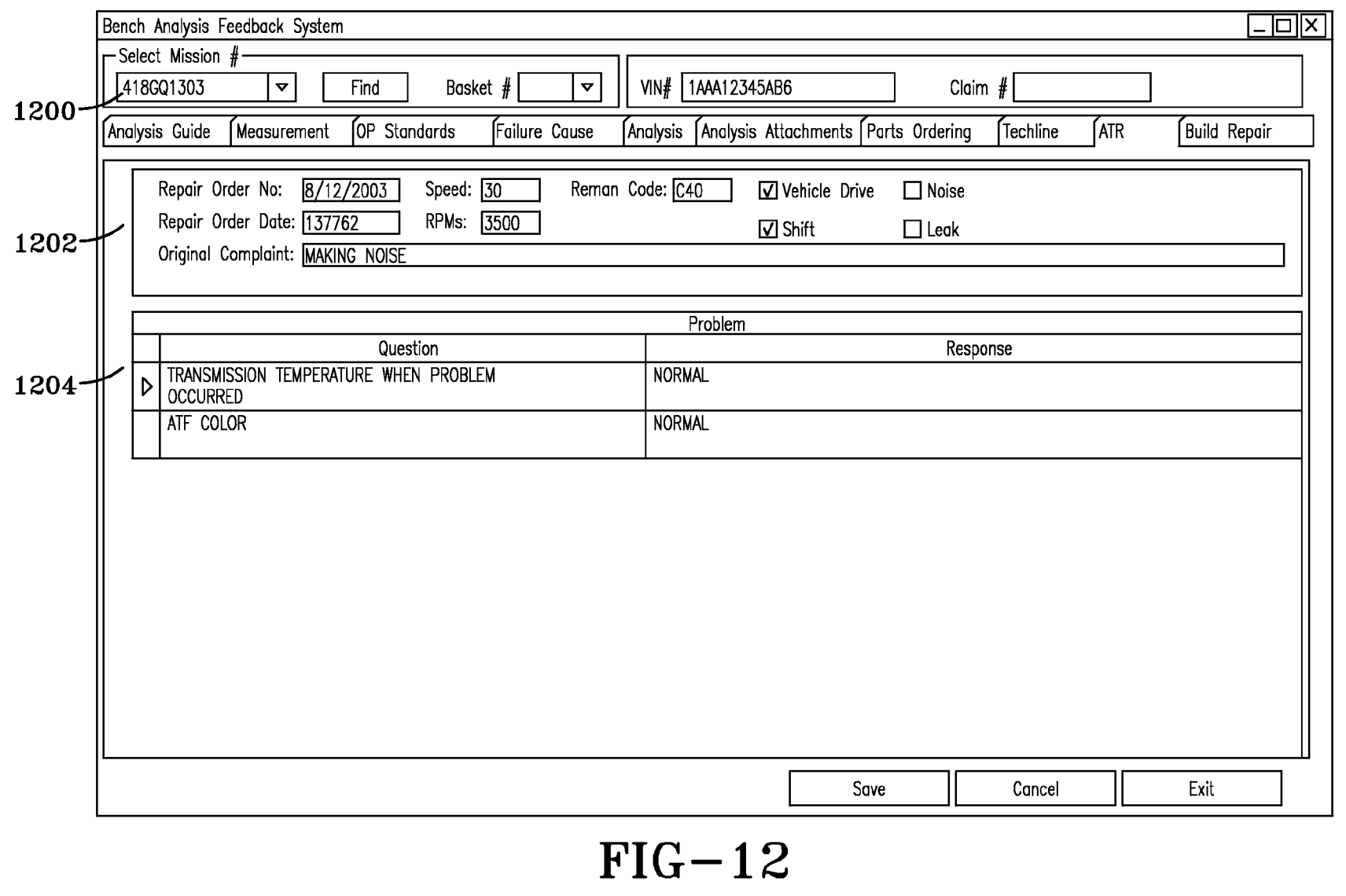

Referring to FIG. 12, an ATR screen for an example embodiment of the present invention is shown. The ATR screen comprises data for prior repairs that have been performed on a transmission. The transmission that is the subject of the inline analysis is identified by serial number at the top of the screen 1200. Repair order information appears near the top of the screen 1202 including the order number, order date, original complaint, and various measurements. In addition, problem information including questions and responses appear in another section 1204.

Figure 13:
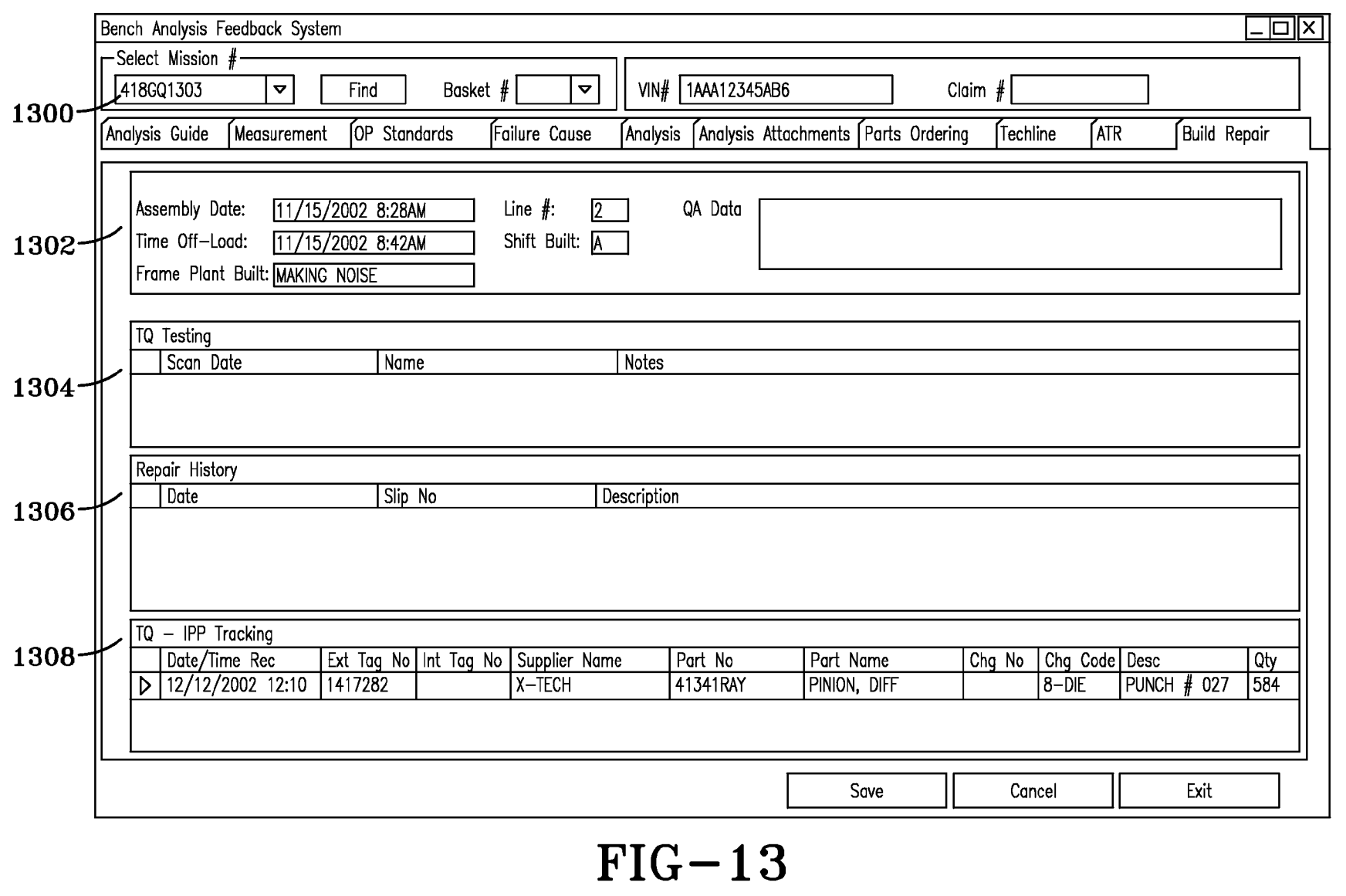

Referring to FIG. 13, a build repair screen for an example embodiment of the present invention is shown. The transmission that is the subject of the inline analysis is identified by serial number at the top of the screen 1300. Data regarding the transmission repair is entered in various sections of the screen. Build information including the assembly date, line number, shift, and quality assurance data and time of completion are entered in one section 1302. Testing data appears in a second section 1304. Repair history data appears in a third section 1306. Part tracking data appears in a fourth section 1308.

Figure 14:
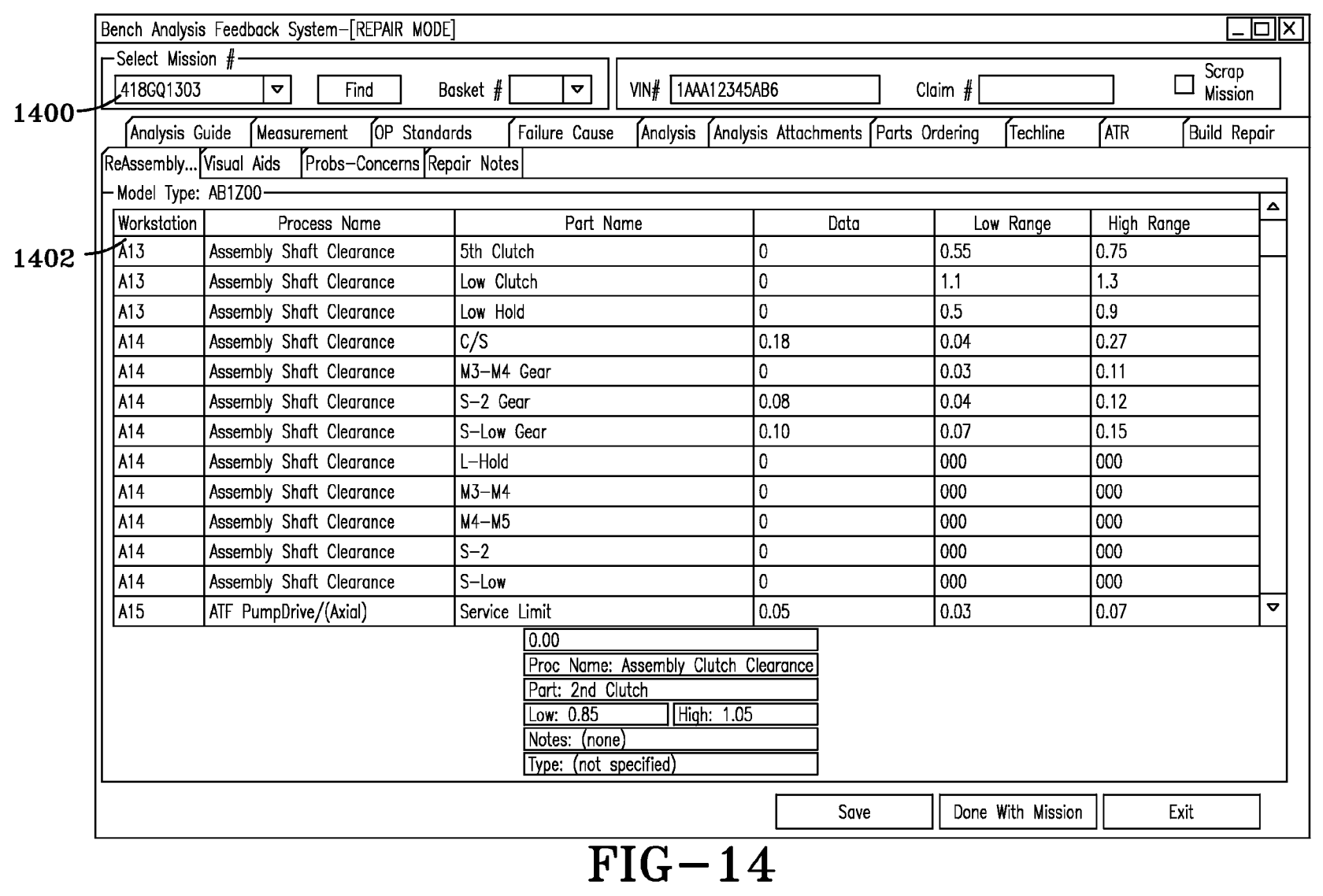

Referring to FIG. 14, a reassembly screen for an example embodiment of the present invention is shown. The transmission that is the subject of the inline analysis is identified by serial number at the top of the screen 1400. The reassembly screen comprises a list of process names and part names for each part that is repaired or replaced during the transmission assembly procedure 1402. It also comprises an identifier for a workstation where the process was completed and measurement data related to the installation of the part. This information provides details regarding the completion of the repair and whether the repair was completed according to defined processes and within specifications.

Figure 15:
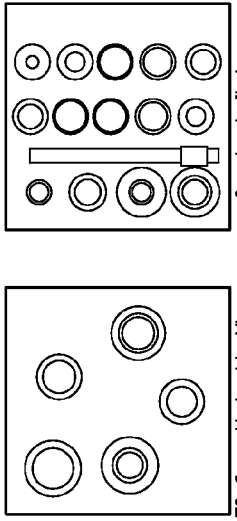
FIG. 15 is a visual aids screen for an example embodiment of the present invention.

Referring to FIG. 15, a visual aids screen for an example embodiment of the present invention is shown. The transmission that is the subject of the inline analysis is identified by serial number at the top of the screen 1500. One or more pages of photographs or diagrams 1502 may be accessed from this screen to assist associates in completing the transmission repairs.

Figure 16:
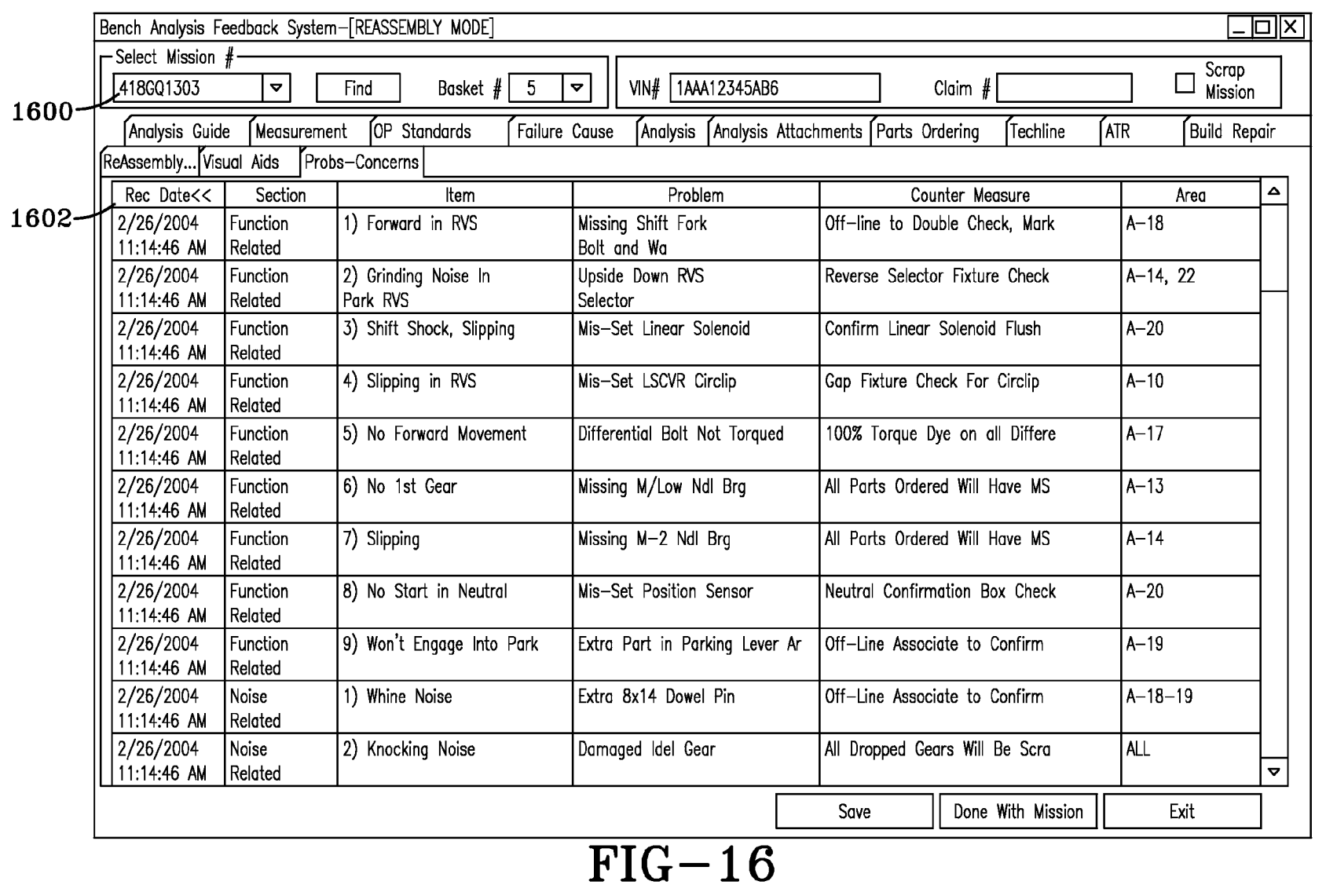

Referring to FIG. 16, a problems-concerns screen for an example embodiment of the present invention is shown. The transmission that is the subject of the inline analysis is identified by serial number at the top of the screen 1600. Information related to symptoms, associated problems, and countermeasures are displayed on this screen 1602. For each problem, in addition to a description of the symptom, problem, and countermeasure, a date and time, transmission section or function, and transmission area are shown. The countermeasures relate to various process changes that may be implemented on the production line to reduce or eliminate transmission failures attributable to the associated problem. Because the necessary information is recorded, tracked, and analyzed in the computerized system of the present invention, countermeasure information may be communicated quickly to the manufacturer's regular production facilities (including the new transmission assembly facility and automobile assembly facility) to prevent future problems. Electronic notifications, reports, etc. may be forwarded to computers at the new transmission assembly facility and automobile assembly facility so that countermeasures may be implemented as soon as possible.

The computerized system and method of the present invention supports the collection and recording of data from the time a problem is reported to an automobile dealer until an inline analysis on a failed transmission is completed and the transmission is repaired. Detailed data is collected from various sources and analyzed to determine the root cause of transmission failures. For problems related to production control, information regarding transmission failures may be communicated quickly and efficiently to a manufacturer's new transmission assembly facility and/or automobile assembly facility so that countermeasures may be implemented to prevent future transmission failures.

While example embodiments of the invention have been illustrated and described, various modifications and combinations can be made without departing from the spirit and scope of the invention. For example, the features and functionality of the present invention may be implemented in fewer or more software components than described according to an example embodiment of the present invention. In addition, steps in the inline analysis process may be added, deleted, or modified and fall within the scope of the claims of the present invention. Modifications, combinations, and equivalents to the system and method of the present invention are intended to be covered and claimed.

What is claimed is:

1. A computerized method for determining the cause of an automobile transmission failure comprising:
   reviewing computerized automobile transmission failure and problem report data for trends to select for inline analysis a plurality of automobile transmissions with a common problem;
   adding said each of said plurality of automobile transmissions with said common problem to a production schedule;
   completing an inline analysis of each of said plurality of automobile transmissions with said common problem according to said production schedule to identify one or more sources of said common problem;
   entering in a computer data related to said inline analysis of each of said plurality of automobile transmissions with said common problem; and
   analyzing said computer data related to said analysis of each of said plurality of automobile transmissions to determine the cause of failure for each of said plurality of automobile transmissions.

2. The method of claim 1 further comprising identifying whether the cause of failure for each of said plurality of automobile transmissions is related to production control.

3. The method of claim 2 further comprising communicating failure information to a manufacturing production facility if the cause of failure for each of said plurality of automobile transmissions is related to production control.

4. The method of claim 3 further comprising implementing countermeasures at a manufacturing production facility to prevent future failures.

5. The method of claim 4 wherein said manufacturing production facility is an automobile transmission production facility.

6. The method of claim 4 wherein said manufacturing production facility is an automobile production facility.

7. The method of claim 1 wherein entering in a computer data related to said analysis of each of said plurality of automobile transmissions comprises selecting options for a component, subcomponent, and observed problem to create a failure tree.

8. A computerized system for determining the cause of an automobile transmission failure comprising:
   a first software component for accessing and analyzing computerized automobile transmission failure and problem report data for trends to select for inline analysis a plurality of automobile transmissions with a common problem;
   a second software component for adding said plurality of automobile transmissions with said common problem to a production schedule; and
   a third software component for 1) entering inline analysis data related to each of said plurality of automobile transmissions with said common problem wherein said inline analyses are completed according to said production schedule and 2) analyzing said inline analysis data to determine the cause of failure for each of said plurality of automobile transmissions.

9. The system of claim 8 further wherein said third software component for analyzing said inline analysis data for each of said plurality of automobile transmissions comprises determining whether the cause of failure for each of said plurality of automobile transmissions is related to production control.

10. The system of claim 9 further comprising a software component for communicating failure information to a manufacturing production facility if the cause of failure for each of said plurality of automobile transmissions is related to production control.

11. The system of claim 10 wherein said manufacturing production facility is an automobile transmission production facility.

12. The system of claim 10 wherein said manufacturing production facility is an automobile production facility.

13. A computerized method for determining the cause of an automobile transmission failure comprising:
   reviewing computerized automobile transmission failure and problem report data for trends to select for inline analysis a plurality of automobile transmissions with a common problem;
   adding said each of said plurality of automobile transmissions with said common problem to a production schedule;
   completing an inline analysis of each of said plurality of automobile transmissions with said common problem according to said production schedule to identify one or more sources of said common problem;
   entering in a computer data related to said inline analysis of each of said plurality of automobile transmissions with said common problem; and
   analyzing said computer data related to said inline analysis of each of said plurality of automobile transmissions to determine causes of failure attributable to production control; and
   implementing countermeasures in production control at a manufacturing facility to prevent future failures attributable to production control at said manufacturing facility.

14. The method of claim 13 wherein said manufacturing production facility is an automobile transmission production facility.

15. The method of claim 13 wherein said manufacturing production facility is an automobile production facility.

16. The method of claim 13 wherein entering in a computer data related to said inline analysis of each of said plurality of automobile transmissions comprises selecting options for a component, subcomponent, and observed problem to create a failure tree.

17. A computerized system for determining the cause of an automobile transmission failure comprising:
   processor;
   memory;
   a first software component for accessing and analyzing computerized automobile transmission failure and problem report data for trends to select for inline analysis a plurality of automobile transmissions with a common problem;
   a second software component for adding said plurality of automobile transmissions with said common problem to a production schedule; and
   a third software component for 1) entering inline analysis data related to each of said plurality of automobile transmissions with said common problem wherein said inline analyses are completed according to said production schedule and 2) analyzing said inline analysis data to determine causes of failure for each of said plurality of automobile transmissions attributable to production control at a manufacturing facility; and
   a fourth software component for communicating failure information to said manufacturing facility for the purpose of implementing countermeasures in production control at said manufacturing facility to prevent future failures attributable to production control at said manufacturing facility.

18. The system of claim 17 wherein said manufacturing production facility is an automobile transmission production facility.

19. The system of claim 17 wherein said manufacturing production facility is an automobile production facility.

20. The system of claim 17 wherein said third software component for entering inline analysis data related to each of said plurality of automobile transmissions with said common problem comprises options for selecting for a component, subcomponent, and observed problem to create a failure tree.

* * * * *